UNITED STATES PATENT OFFICE.

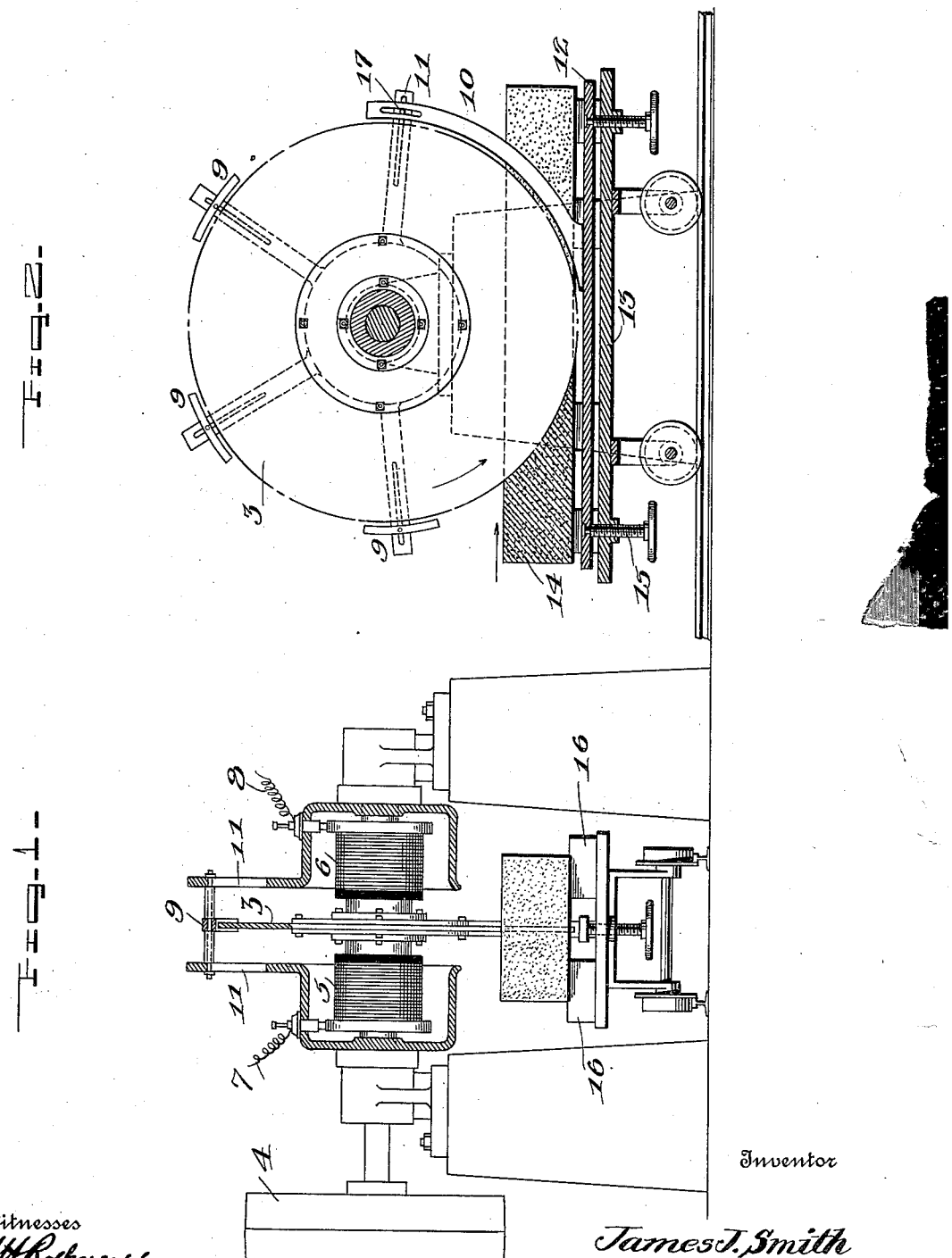

JAMES J. SMITH, OF NEW YORK, N. Y.

STONE-CUTTING SAW.

1,043,475.  Specification of Letters Patent.  Patented Nov. 5, 1912.

Application filed February 24, 1911. Serial No. 610,486.

*To all whom it may concern:*

Be it known that I, JAMES J. SMITH, a citizen of the United States, residing at New York, borough of Manhattan, in the county of New York and State of New York, have invented certain new and useful Improvements in Stone-Cutting Saws, of which the following is a specification.

This invention relates to improvements in rotary stone-cutting saws, and has particular reference to such a saw working in a magnetic field such as forms the subject-matter of Patent No. 985,465, granted to me on February 28, 1911.

The object of this improvement is to provide a magnetic pole at the underside of the saw, whereby paramagnetic abrasive material or metallic shot may be securely held to the cutting-edge of the saw, and such shot as are fed to the saw may be more readily picked up and held in place.

The invention therefore consists in the construction and combination of parts substantially as hereinafter set forth and claimed.

In the accompanying drawing which forms a part of this specification, Figure 1 represents in partially sectionized elevation a stone-cutting mechanism embodying the present invention; and Fig. 2 represents a vertical section through said mechanism showing the saw in side elevation and in broken lines, simply to show the relation thereto of the improvement.

In the patent referred to a rotary saw as indicated at 3 is suitably mounted to be driven by power through the medium of the pulley 4. This saw is placed in a magnetic field by means of electro-magnets 5 and 6 mounted on the arbor of the saw. These magnets are so wound that they present like poles to the saw blade as current is supplied through conductors indicated at 7 and 8. The saw thus forms one pole of the magnetic circuit. Other poles of the mangetic circuit are formed by means of pole-pieces 9 and 10, carried in radial arms 11. These pole-pieces 9 and 10 are adjustable toward the center of the saw that they may be placed in the desired proximity to the periphery of the saw as it wears away.

It has been found by experiment that the saw will pick up and hold to its periphery the paramagnetic abrasive material or metallic shot more effectively when a magnetizable bar or plate is located under the lower edge of the saw. One way in which this plate or bar may be located in such position is indicated in the drawing. The bar as represented at 12 is mounted longitudinally of the stone car 13, on which a block of stone as 14 is represented as being sawed. One way of attaching the bar 12 to the car is by means of the screws 15, on the upper ends of which the bar is mounted. These screws work through nuts in the floor of the car or attached to said floor. The arc-shaped pole-piece 10 is extended into contact with or into close proximity to the bar 12 whereby said bar may become a part of the magnetic circuit exterior to the saw blade. As the saw travels through the stone the pole-piece 10 will follow it in the kerf. As the saw wears away, the bar 12 and pole-piece 10 may be adjusted to keep them in desired proximity to the periphery of the saw. Chocks as 16 of different thicknesses may be used on the car 13 to raise the stone to the desired height as the saw wears away.

By the structure above described, it will be seen that by the bar 12 there is provided at the under edge of the saw a magnetic pole that may move with the stone and so present itself at all times within predetermined and fixed proximity to the lower edge of the saw as the saw cuts its way through the stone, thus maintaining during the cutting operation a fixed magnetic field of maximum strength at the point where it is desired to pick up and apply to the periphery of the saw the abrasive material. The adjustment of the pole-piece 10 upon the arms 11 may be effected in any suitable way, as by means of slots as shown and by a bolt as 17 passing through said slots.

The invention claimed is,—

1. In a stone-cutting mechanism, the combination with a rotary saw, of a stone carrying car, a magnetizable bar on said car in the plane of the saw, and means whereby said bar and saw are made proximate poles of a magnetic circuit.

2. In a stone-cutting mechanism, the combination with a rotary saw, of a stone carrying car, electro-magnetic means whereby a magnetic circuit is formed of which the saw constitutes one pole, and a proximate pole in said magnetic circuit carried by said car.

3. In a stone-cutting mechanism, the combination with a rotary saw, of a stone carrying car, electro-magnetic means whereby a magnetic circuit is formed of which the saw constitutes one pole, and a proximate pole in said magnetic circuit mounted upon said car and adjustable toward the saw.

4. In a stone-cutting mechanism, the combination with a rotary saw, of a stone carrying car, electro-magnetic means whereby a magnetic circuit is formed of which the saw constitutes one pole, a pole-piece adjustable to and from the periphery of the saw and adapted to follow the saw into its kerf, and a magnetizable bar or plate upon the car in close proximity to the lower end of said adjustable pole-piece.

5. In a stone-cutting mechanism, the combination with a rotary saw, of a stone carrying car, electro-magnetic means whereby a magnetic circuit is formed of which the saw constitutes one pole, and means whereby a proximate magnetic pole may be maintained in the plane of the saw at the lowermost edge thereof.

In testimony whereof I have affixed my signature in presence of two witnesses.

JAMES J. SMITH.

Witnesses:
 G. H. D. FOSTER,
 JOHN C. WAIT.

Copies of this patent may be obtained for five cents each, by addressing the "Commissioner of Patents, Washington, D. C."